INVENTOR
Horace L. Smith, Jr.

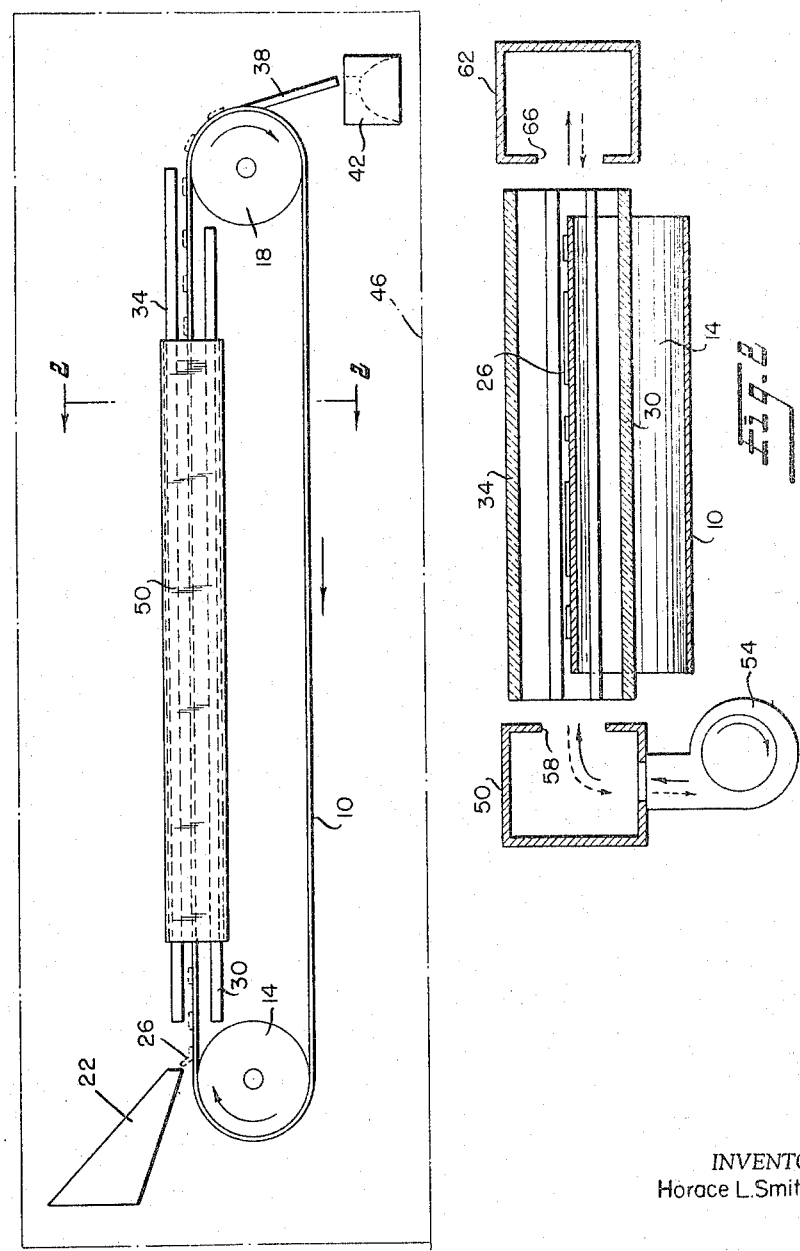

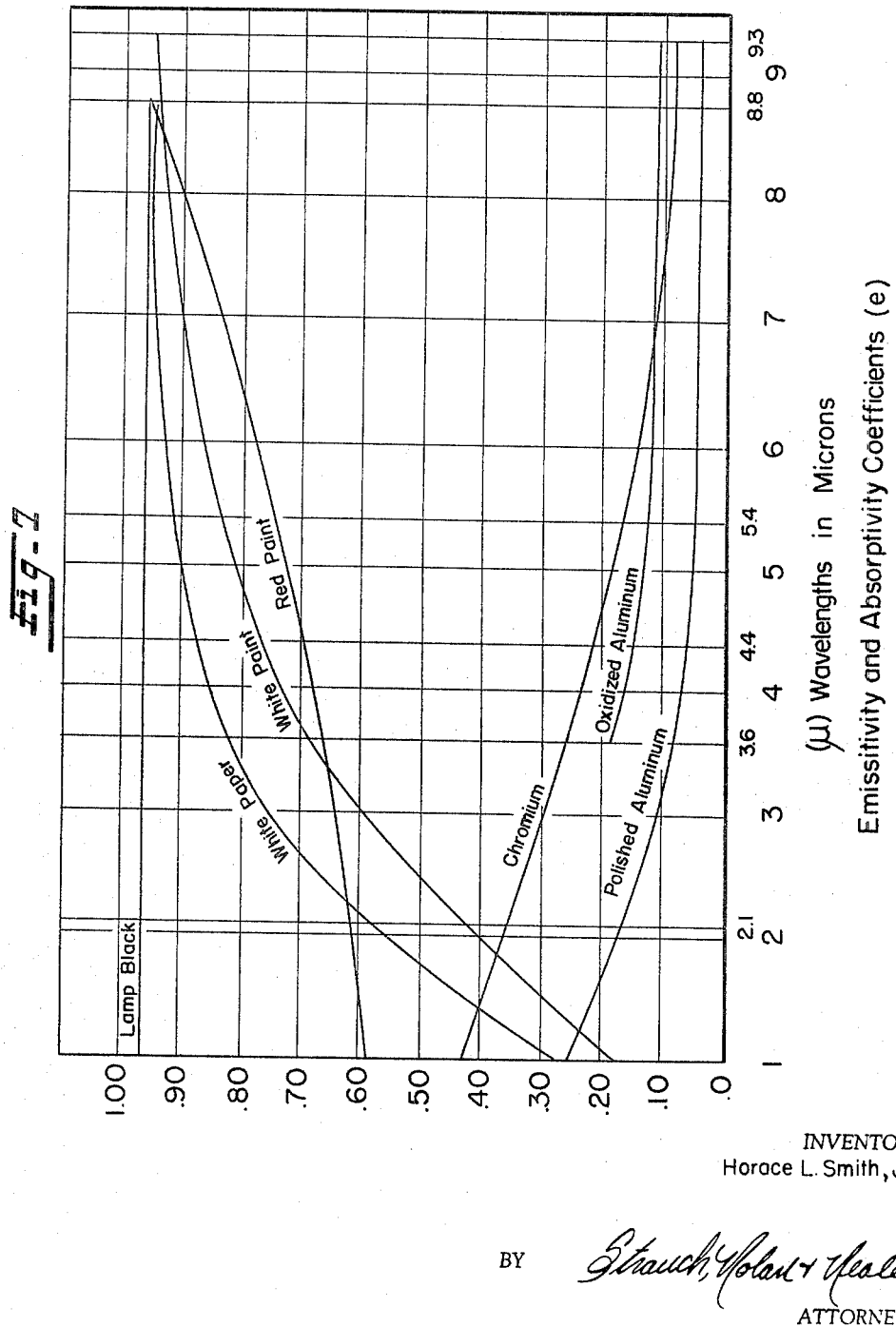

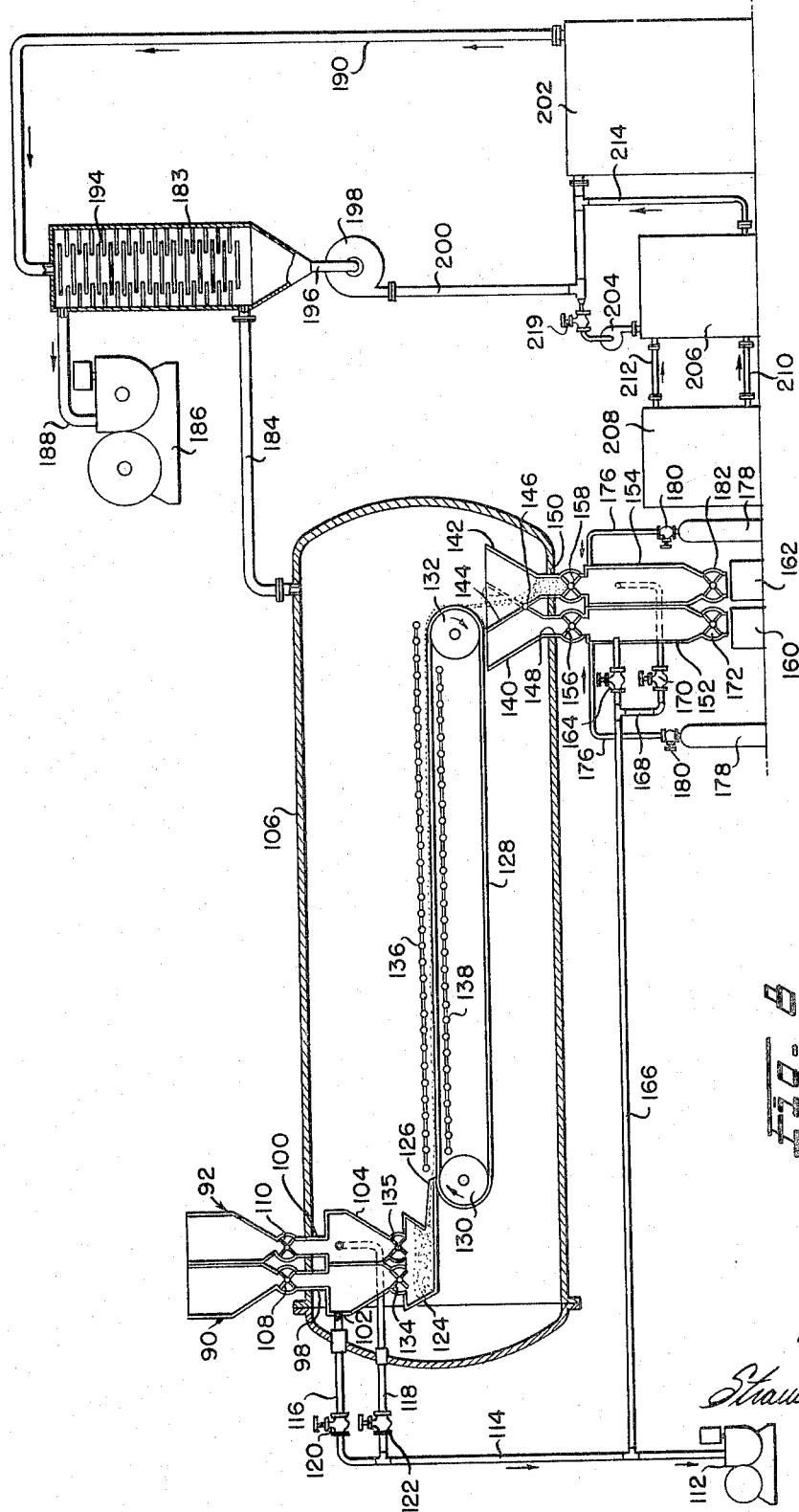

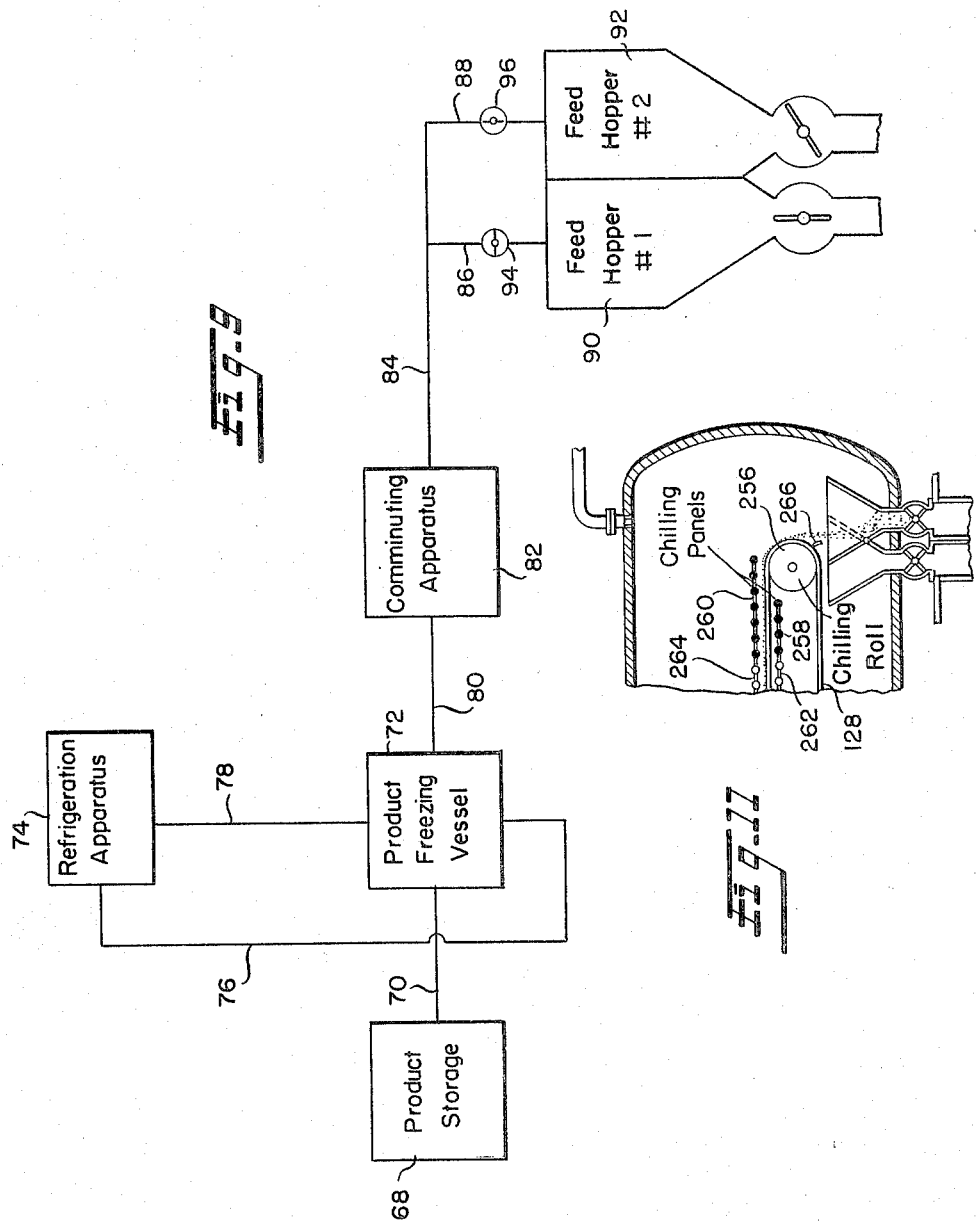

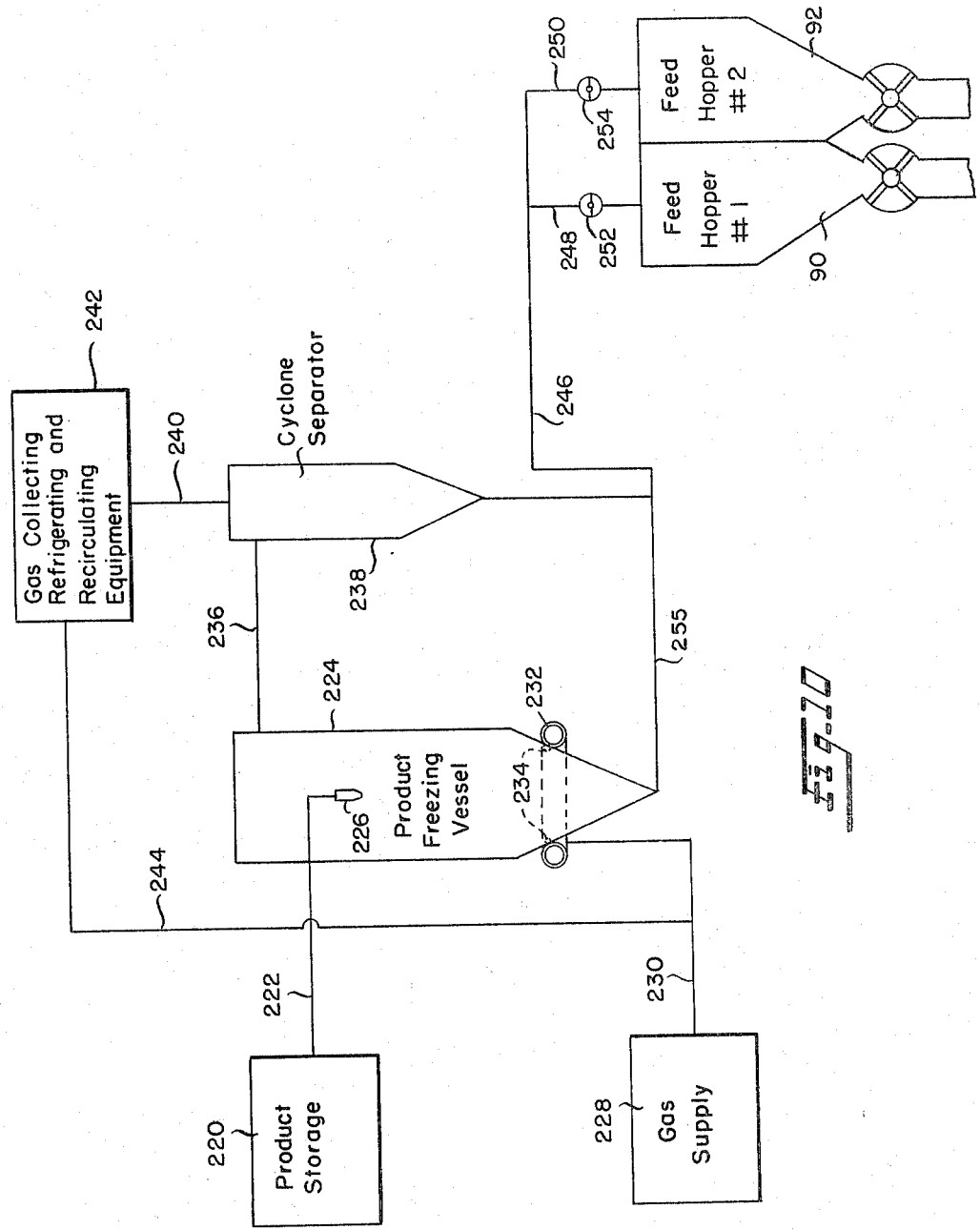

United States Patent Office 3,266,169
Patented August 16, 1966

3,266,169
VACUUM FREEZE DRYING APPARATUS
Horace L. Smith, Jr., Richmond, Va., assignor to Hupp Corporation, Cleveland, Ohio, a corporation of Virginia
Filed Oct. 31, 1962, Ser. No. 234,285
9 Claims. (Cl. 34—58)

This is a continuation-in-part of application Serial No. 151,824, filed November 13, 1961, now Patent No. 3,157,-476 issued November 17, 1964.

This invention relates to improvements in radiant energy heat treatments, and more particularly to improvements in methods and apparatus for heating, cooling, curing and drying materials such as foodstuffs, fertilizers, plastics (e.g., extruded or foamed plastics), pharmaceutical materials, culture media and analogous materials, and the like, in preparing them for storage, shipping and/or consumption. The principles of this invention have wide application, but are eminently illustrated by their utilization in dehydrating processes and apparatus described in detail hereinafter as a preferred embodiment.

Dehydration of such products has been carried out for many years in apparatus including an endless corrosion resistant conveyor belt operating over a pair of spaced rotatable drums passing the product to be dehydrated on the upper traveling surface through a heating zone. Such prior, presently conventional, dehydrating apparatus and techniques are illustrated by way of example in United States Patents 2,924,271, 2,924,272, 2,924,273 issued to W. E. Conley et al., and my earlier United States Patent 2,515,098. The continuous conveyor belt in such dehydrators operating under either subatmospheric or atmospheric pressures must be flexible, nonrusting, or noncorrodible material, and be capable of withstanding repeated wide temperature variations. Therefore, from a practical standpoint, the only acceptable belt material used extensively to date, is thin flexible stainless steel, and for certain more limited purposes, thin flexible polished aluminum.

In said prior conventional dehydrators the material to be dehydrated is formed into a liquid or semiliquid concentrate and deposited through a feed mechanism in a layer or film of substantially uniform thickness on the conveyor belt which carries the layer under a preheater comprised of a bank of radiant heating elements located between the spaced drums. The steam heated drum supplies most of the latent heat necessary to dry the material, the radiators being present as supplementary heat sources. After drying, the product passes over a cooling drum where its temperature is quickly reduced to facilitate removal from the belt and to prevent loss of flavor and other desired properties.

One of the primary disadvantages of said conventional dehydrators is that the size of the heating drum must be increased if it is desired to increase the capacity of the dehydrator. To eliminate this and other disadvantages the disclosure of my United States Patent No. 2,728,387 supplies all heat necessary for dehydration by radiant heater elements disposed on opposite sides of each leg of the conveyor belt between the spaced apart rotatable drums. A suitable high boiling point heat transfer fluid is circulated through the radiators at a relatively high temperature, but at relatively low pressure as disclosed in this patent which eliminates construction and maintenance of pressurized steam containers such as the conventional steam heated rotatable drum and the necessary condensate removal and drainage system.

My prior use of radiant heaters as the sole heat source has been a substantial advance in the art. However, it does not utilize the full capabilities of radiant heating primarily due to the low radiation absorptivity of the conveyor belt which has a relatively highly polished radiation reflective surface, and the temperature limitations of the high boiling heat transfer media used in the radiators.

In the prior conventional dehydrating equipment heat is applied to the product by the steam heated rollers or drums through the uncoated inner surface of the conveyor belt and the temperature of the material coating or layer to be dehydrated is therefore dependent upon the temperature of the drum and the thermal conductivity of the belt. In my improved radiant heating equipment without use of steam the radiant heaters are located on both sides of the conveyor belt and product temperature is governed by the characteristics of the radiators, temperature of the heat transfer media circulated therein, capacity of the product to absorb radiant energy from radiators located on the product supporting outer side of the belt, and capacity of the inner side of the conveyor belt to absorb the impinging radiant energy and to transfer it to the product in the form of heat. The radiation and heat absorptivity of the liquid concentrate is always highly adequate and the radiators radiating directly to the product itself on the outside of the belt supply the heat energy directly to the product. However, radiators positioned inside the endless conveyor belt radiate directly to the polished uncoated metal surface of the belt which is highly reflective of the radiation, and the heat transfer from the inner radiators is therefore very inefficient.

Therefore, one primary object of the present invention and discoveries is improvement of the capacity and efficiency of radiation heated type conveyor belt dehydrators and heat treating equipment without addition of radiant heating capacity. This I accomplish by materially reducing the radiation reflectivity and improving the coefficient of radiant energy absorption of the inner side of the belt opposite the product carrying side so it will absorb radiation at a much higher rate than heretofore, with resultant material increase of the temperature of the belt and the heat supplied to the material layer on the opposite side of the belt without increase of heat input, and by co-ordination of exposure times and temperatures with utilization if improved radiators designed for radiation wave length emissivities providing peak heat transfer co-ordinated with the radiation and heat absorptive characteristics and the ultimate desired characteristics and uses of the end products.

While this novel concept in hindsight may appear obvious, in its most simple application, that it is far from obvious to those of highest skill in this highly active art is shown by their failure, and my own failure during many years of continuous active work in dehydration and radiant treatment of such products, to appreciate the practical possibilities of and need for my pesent invention.

The principles of the present invention may also be utilized to provide novel high vacuum, endless belt drying apparatus which may be employed with beneficial results in the freeze drying of liquid bearing materials including instant or soluble coffee and tea, milk products, various pharmaceutical products, citrus fruit juices, and similar products.

The freeze drying technique is bottomed on a well known thermodynamic principle; viz., that at high vacua water can exist only as a solid or as a vapor, depending upon its temperature. Thus, at 0.180 ins. of Hg abs., solid water will pass directly from a solid to a vapor (sublimate) at a temperature of approximately 32° F. and at a pressure of 0.0126 ins. of Hg abs. will sublime at −20° F.

This phenomenon is utilized in freeze drying by first freezing the product to be dried and then placing it in a chamber in which a high vacuum is maintained. The product is then heated to effect sublimation of the moisture in the product.

The advantages of freeze drying, which are realized in full in my novel process, are that the taste and certain other important characteristics of the reconstituted food and other products do not differ noticeably from that of the original product and that the dried materials are highly soluble and can be readily reconstituted. Another and important advantage of my improved freeze drying process is that the removal of moisture from the product is effected at substantially lower temperatures than is possible by employing conventional drying techniques, preventing damage to heat sensitive products.

In the past freeze drying techniques have been carried out in most part in batch-type driers such as those disclosed in United States Patents Nos. 2,471,325 issued May 24, 1949, to Hickman for "Vacuum Dehydration" and 2,471,677 issued May 31, 1949, to Flosdorf for "Process of Dessicating Orange Juice Involving Freeze-Drying." As this batch-type freeze drying technique is currently practiced, the product is frozen and placed in a shallow tray in layers in the order of an inch thick. The trays are then placed in multi-shelf driers which, in substance, are large rectangular vacuum chambers having shelves which support the trays and through which hot water or steam is circulated. The heated shelves radiate heat to the upper surface of the layers of frozen product and heat the trays by conduction.

In addition to the drawbacks which inhere in any batch-type process, a further disadvantage of the process described above arises from the fact that heat must be applied to the product at a very low rate to prevent surface damage and therefore requires an inordinately long time to warm the moisture in centers of the frozen layers to the sublimation temperature. Thus, it has been found that approximately 500 minutes (eight hours) is required to dry a layer of frozen food product one inch thick without damaging the product. Such processing is laborious, slow, and costly and has never gained wide spread acceptance.

One of the fundamental laws of heat transfer states, in effect, that a homogenous layer of material heated on one side may be raised to a given temperature four times as fast by having its thickness. It is impractical to reap the benefits of this rule in a shelf type drier, however, since (1) the quantity of product in each tray becomes so small that any saving in drying time is to a large extent offset by the cost of handling a larger number of trays; and (2) the increase in tray area requires a drier of impractically large dimensions.

Another approach to the use of freeze drying techniques which takes advantage of the above-discussed phenomenon, shown in my prior United States Patent No. 2,515,098, employs a continuous conveyor disposed in a cold high vacuum chamber onto which the material to be dried is sprayed in a fine mist and under high pressure. Because of the low pressure and temperature in the vacuum chamber, the particles of material will rapidly freeze on the belt. As the belt with the particles frozen thereon moves through the vacuum chamber, the conveyor belt is passed over a heated platen which heats and evaporates the water from the frozen product.

There are several drawbacks to this type of apparatus. One is that many products to which freeze drying techniques may be beneficially applied are not susceptible of being broken into a sufficiently fine mist, or, if they are, it may not be desirable to comminute them to the extent necessary to form such a mist. Another drawback as observed in the process of my prior patent is that the particle formation in the spray nozzles must be closely controlled to secure proper freezing of the particles. Another difficulty is in spraying the product onto the conveyor belt with sufficient accuracy to form a layer having a thickness of acceptable uniformity.

Still another freeze drying apparatus heretofore proposed is shown in United States Patent No. 2,751,687 issued June 26, 1956, to Colton for "Process and Apparatus for Producing Stabilized Products." The Colton apparatus, as disclosed, is not commercially feasible as it requires the product to be frozen into specially configured "globules" and it would require an inordinately high capital investment to construct the device disclosed for producing such globules in a capacity large enough for a commercial application. Additionally, the apparatus disclosed by Colton lacks a heat source even remotely as efficient as that provided by the present invention, necessitates the use of a conveyor belt having extremely low wear resistance, and lacks an efficient system for removing evaporated water from the vacuum chamber. The Colton patent process also fails to realize that significant increase in capacity may be effected by spreading the product in very thin layers and thus further fails to disclose a freeze drying process or apparatus which will approach the efficiency of the present invention.

Another primary object of the present invention therefore resides in providing a novel process of and improved equipment for freeze drying comestible, pharmaceutical, and other products.

In the novel freeze drying process provided by the present invention the product to be dried is reduced to a fine frozen powder by freezing and comminuting it or by spraying it into a flowing stream of cold, inert gas. The frozen powder is then delivered to a storage vessel from which it is fed onto a vibrating feeder which spreads it in a very thin layer of uniform thickness onto the belt of a continuous conveyor sealed in a vacuum chamber and provided with the novel radiant heat transfer mechanism described above. As the belt passes through the vacuum chamber, radiant heat rapidly effects sublimation of the water from the frozen product.

As was pointed out above, about 500 minutes is required to dry a one inch thick layer of food product. Assuming that a continuous conveyor in accord with the present invention having a 20" wide belt and a product feed rate of 100 cu. in./min. is employed to freeze dry a desired food product, a belt having a capacity of 50,000 cu. in. must be 2,500 inches (208' 4") long and must be operated at a speed of 5" per minute to insure that the product is dried for the full 500 minutes. The following table shows the astonishing results that can be obtained by taking advantage of the heat transfer phenomenon described above by reducing the thickness of the product layer, a practice eminently practical with the novel apparatus of the present invention.

[Product feed rate: 100 cu. in./min. Belt width: 20 ins.]

| Layer Thickness, ins. | Drying Time, mins. | Belt Length, ins. (ft.-ins.) | Belt Speed, ins./min. |
| --- | --- | --- | --- |
| 1.0 (1) | 500 | 2,500 (208-4) | 5 |
| 0.5 (½) | 125 | 1,250 (104-2) | 10 |
| 0.25 (¼) | 32 | 625 (52-1) | 20 |
| 0.125 (⅛) | 8 | 320 (26-8) | 40 |
| 0.0625 (1/16) | 2 | 160 (13-4) | 80 |
| 0.03125 (1/32) | ½ | 80 (6-8) | 160 |

The novel apparatus described above thus makes it possible to combine the advantages of freeze drying techniques with high productive capacity and makes freeze drying possible at a cost which compares favorably with conventional vacuum drying techniques. In this respect it represents a substantial advance over the noncommercial prior art freeze drying devices discussed above.

Other objects and advantages of the present invention will become apparent from the following description, appended claims and accompanying drawings wherein:

FIGURE 1 is a diagrammatic front elevation view of a heat applying apparatus embodying the principles of the present invention;

FIGURE 2 is a side elevation view in section taken along line 2—2 of FIGURE 1;

FIGURE 7 is a chart showing emissivity and absorptivity coefficients of various materials for different radiation wave lengths;

FIGURE 8 is a partially diagrammatic view of heat applying apparatus which embodies the principles of the present invention and which is particularly adapted to be utilized in a freeze drying system;

FIGURE 9 is a diagrammatic view of apparatus for reducing the product to be dried to finely divided frozen particles;

FIGURE 10 is a diagrammatic view of another type of apparatus for reducing the product to finely divided frozen particles; and FIGURE 11 is a view corresponding to a portion of FIGURE 8, showing diagrammatically apparatus for chilling dried material.

Figure 3:
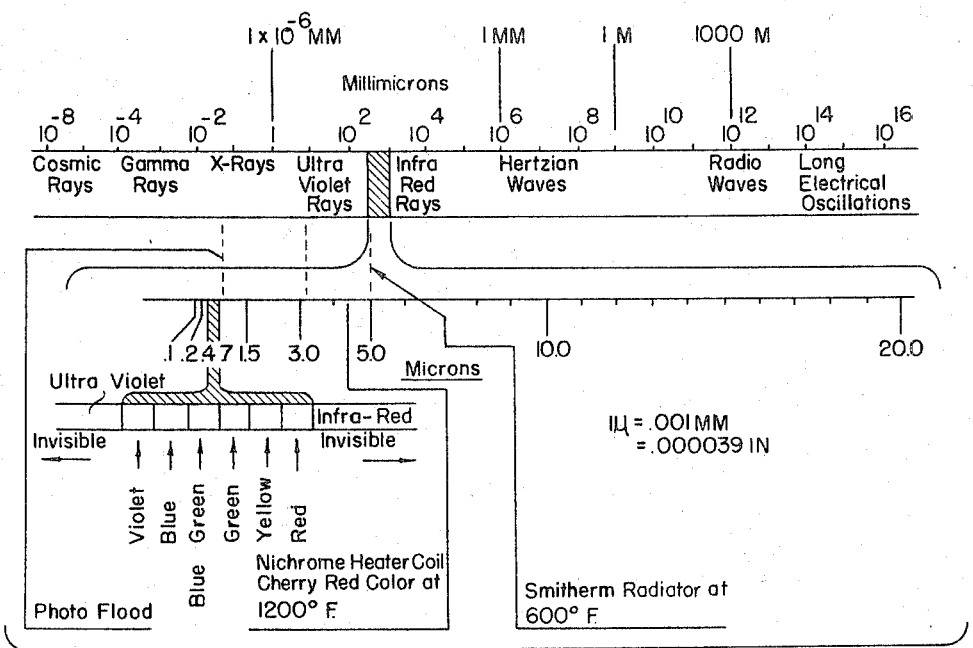
FIGURES 3–6 are diagrammatic representations of certain features of the character of radiant energy necessary to an understanding of the present invention.

Referring now to the drawings, FIGURE 1 illustrates diagrammatically a process and apparatus for applying radiant heat to articles, and more particularly for, dehydrating such articles. A thin endless stainless steel or similar metal belt 10 is trained about a pair of spaced rotatably mounted rollers or pulleys 14 and 18 either one or both of which may be driven in the direction indicated by the arrows thereby an appropriate source of power (not shown). A dispenser 22 which may be for example, a hopper with control outlet, is located above and adapted to distribute material 26 to be heated, onto the outer surface of belt 10. Radiators 30 and 34 are mounted in the apparatus substantially parallel to a leg of the belt between rollers 14 and 18 and spaced therefrom. Radiators may correspondingly be positioned on the opposite leg of conveyor belt 10 if desired. As the material on belt 10 emerges from between radiators 30 and 34 it is passed over the surface of cooling drum 18, scraped from the belt by doctor blade 38 or other suitable means, and delivered to hopper 42. Radiators 30 and 34 may be of any well known type, such as for example the well known "Smitherm" type of relatively low temperature radiant heater disclosed generally in said prior United States Patent 2,728,387, and of which improved embodiments are disclosed in my copending application Serial No. 64,965, filed October 25, 1960, (now Patent No. 3,174,228), and entitled, "Paper Drying System, Apparatus and Method," and various types of primary air and premix radiant gas heaters such as the well-known "Perfection Schwank" burners, both sold by the Hupp Corporation of Cleveland, Ohio, and other well-known types depending upon the products to be treated.

The dehydrating apparatus may be enclosed in a housing 46 (shown in phantom lines in FIGURE 1) if it is desired to carry out the dehydration in a subatmospheric environment. The water vapors resulting from the drying may be removed from the enclosure by any of several conventional methods for example, by the employment of steam jets, absorption by a dried dessicant such as silica jell, by collection on refrigerated surfaces upon which they will freeze, or by condensation by sprays of refrigerated lithium chloride or other low vapor pressure condensing liquid as described in my United States Patent No. 2,728,387.

Instead of providing a dessicant however, and to improve the speed and longevity of operation without shutdown, I may also provide cross ventilating means for removing vaporized or sublimated substances from the heating zone between radiators 30 and 34. As shown diagrammatically in FIGURE 2 this may for example be accomplished for certain types of products by providing an air or gas plenum 50 extending substantially throughout the length of a leg of belt 10. One side of plenum 50 receives the gas or air from any suitable source such as blower 54 and guides it as indicated by the solid line arrows out opening 58 across the heating zone. Plenum 62 on the opposite side of belt 10 collects the vapor laden gases as they emerge from between the radiators through opening 66 and conducts them to exhaust. Or where desirable blower 54 may be reversed to apply suction to plenum 50 thereby reversing the gas and vapor flow as shown in the dotted line arrows in FIGURE 2 so that plenum 62 becomes the inlet and 50 becomes the outlet plenum. And in operations where subatmospheric treatment is desirable the admission of air or gases through the inlet plenum may be restricted or muffled, as desired, for example to prevent ignition of flammable vapors while using radiator temperatures far above the vapor ignition temperature.

Depending upon the material being treated and the results desired, the cross ventilating means may be divided into sections and air or gas at different temperatures supplied or recirculated in the individual sections.

Thus, as material 26 emerges from hopper 22 volatilization will be carried out at a relatively rapid rate and it may be desirable to remove the products of vaporization by cross ventilation, without reducing the material temperature, and with aid of additional convection heating of the materials when desirable. Therefore, air or gas supplied in this section may be preheated up to approximately or above the vaporizing temperature of the most readily volatilizable substance carried by material 26.

The speed of the material through the apparatus and of the treating temperatures, are predetermined to dry or cure the material to the desired state. At the area of bel discharge the material may be cooled if desired by means of a coolant circulated in roll or drum 18 as shown in my United States Patent No. 2,728,387. However, in accordance with this invention cool gas may also be circulated across belt 10 to cool material 26 in the vicinity of roller 18 if desired to eliminate or reduce the need of circulating a coolant in the roller. Substantially uniform coolant temperatures may be applied throughout the contact surface of the belt and drum by providing countercurrent coolant flow channels in the drum as disclosed in my copending United States application Serial No. 118,439, filed June 20, 1961, for "Heat Transfer and Pressure Applying Apparatus and Method of Manufacture "Thereof," (now Patent No. 3,181,605).

To make the optimum selections of my improved belt coatings requires a thorough understanding of radiant heat. As is generally known radiant energy is transferred by electromagnetic vibrations which travel through space at the speed of light, i.e., 186,000 miles per second, and may be regarded as a form of wave motion in which the length of the waves vary according to the temperature of the radiating source. It is however, less generally known that for any given black body temperature, most of the energy is emitted in a rather narrow wave length band although some energy is given off in bands of both shorter and longer wave lengths.

FIGURE 3 shows a logarithmic scale that covers the wave length of the entire electromagnetic spectrum from cosmic rays in the extreme short wave length band to long electrical oscillations. The shaded area in this figure between the ultraviolet and infrared rays has been expanded to show a portion of the scale from 0.1 micron to 20 microns. The entire visible spectrum is included in the narrow band of 0.4 to 0.7 microns and this in turn has been expanded to show the color spectrum from ultraviolet to infrared. For any given radiation approximately 25% is of shorter, and 75% of the energy is at longer wave length than the wave length of peak or maximum energy radiation.

Figure 4:
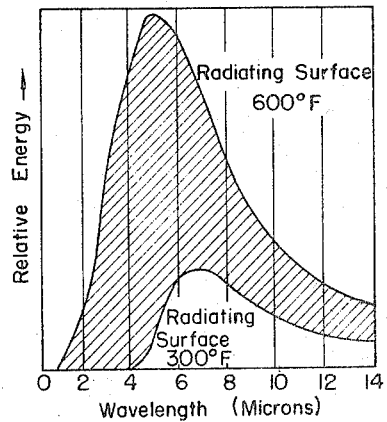

As illustrated in FIGURES 3 and 4, the higher the temperature of the radiator, the shorter the length of the waves given off. The maximum value of radiation intensity, or peak energy emission, varies according to the absolute temperature of the heated radiating body, and an increase in temperature will result in the peak of the energy distribution curve being displaced to shorter wave lengths. FIGURE 4 shows the relative amount of energy radiated from a surface at 300° F. and at 600° F. It also illustrates the effect of a change in temperature of the radiating body; at 300° F. the wave length at the peak of the energy curve is 6.9 microns whereas it is 4.93 microns at 600° F.

According to the Stefan Boltzmann law, the total amount of energy radiated from a body at a given temperature varies as the fourth power of its absolute temperature. In the application of this law, it is necessary to know the surface temperature and condition of the surface, that is, the emissivity coefficient. In the equations of Max Planck there is involved a concept of the "black body" which is defined as a body which absorbs all radiation of all wave lengths falling upon it, and reflects none. Such a theoretical "black body" also radiates the largest amount of energy possible at any given temperature and its emissivity coefficient is therefore unity. It is not practically possible to have a radiating surface that has an emissivity coefficient of one, but it is possible to obtain an emissivity coefficient in the order of 0.95. A highly polished reflecting surface, such as a mirror or polished metal surface reflects most of the radiant energy falling upon it, therefore, its emissivity is very low and can be in the order of 0.05, which means that it would radiate only 5% as much energy as a black body at the same temperature. A surface having an emissivity of 0.95, however, would radiate 95% of the energy that a perfect black body would give off.

Figure 5:
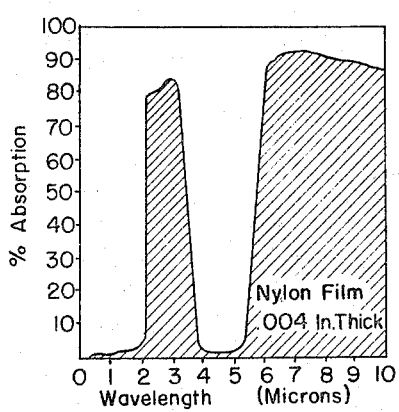
Figure 6:
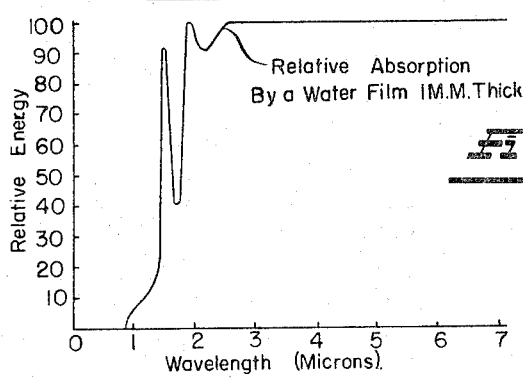

Probably the most obscure and least understood phenomena in connection with the application of radiant heat is the way that radiant heat is absorbed or rejected from a material that is to be heated or cooled. A typical example illustrating this point is shown in FIGURE 5 wherein the rate of radiant energy absorption by a film of nylon 0.004 inch thick is diagramed. The hatched area shows the percent absorption. The energy radiated at a wave length of 6 microns or longer is absorbed readily by the nylon, but if the peak of the radiant energy is at wave length of 4½ microns very little of the energy is absorbed. If it were possible to radiate energy in a very narrow band of from 2.5 to 3.5 microns then again the rate of absorption would be relatively high. FIGURE 6 illustrates the absorptivity of another material, a film of water 1 mm. thick. Every material has an absorption curve of somewhat different configuration, as illustrated by FIGURES 5 and 6.

In accordance with the present invention, the efficiency of radiant heat applying apparatus such as the dehydrator shown in FIGURE 1 is improved by enhancing the absorptivity of the conveyor belt upon which the material being dehydrated or treated is supported, and by the selection of radiant heat radiating at an optimum peak wave length. This I accomplish by coating the inside of the conveyor belt with a suitable heat resistant material which increases the radiation absorption and emissivity coefficients of the belt surface, will effecitvely transfer the absorbed heat by conduction of heat through the belt to the outer material supporting surface, and which will adhere for a reasonable time to the belt through bending use and wide variations in temperatures. Such coating finishes may be applied in any suitable manner, as by chemical means, such as anodizing, applied by brushing, spraying, or rolling, and subsequently baked or heat treated or electrically deposited on the belt surface. Examples of suitable coatings may be the colored silicone varnishes, lamp black applied in a vehicle, black enamel, lacquer of shellac; and a particularly desirable coating for many uses may be applied to the belt in accordance with the ebonizing process disclosed in United States Patent No. 2,394,899 which provides a smooth, black oxide film or skin about one-hundred-thousandth of an inch thick to the surface of either chromium-nickel or chromium stainless steel belt materials. The blackened "skin" which retains the corrosion resistance of stainless steel is applied, after conventional cleaning steps of the parts to be treated, by immersing the parts in a molten bath of dichromates at a temperature of 730 to 750° F. for approximately 15 to 30 minutes, followed by cooling and rinsing.

FIGURE 7 illustrates the importance of selecting a proper coating material for the belt. Thus, in higher temperature and therefore shorter wave length uses, white paint has a low absorptivity and would not improve the characteristics of chrome or aluminum finished materials. However, where the peak radiation incidence is of comparatively long wave length (e.g., 5–8.8 microns) white paint would effectively improve the absorption property of a chrome or aluminum finished article. Red paint has a higher absorptivity coefficient for radiation of 1–3.4 microns than does white paint even though darker hued materials are generally considered to absorb better than light materials. Lamp black provides an absorptivity coefficient of .95 or higher, and in a silicone varnish vehicle is therefore also an excellent coating material in any wave length range. I have also discovered that very thin glass frit enamels available commercially fused to a metal surface provide coatings having absorptivity coefficients up to 0.98 that are durable in use and will withstand relatively high temperatures without substantial impairment of heat transfer through the metal, which can be separated from the metal base only with great difficulty if at all, and which will retain their integrity as a highly emissive and absorptive surface for relatively long time periods. Such coatings are desirable as surface coatings for the conveying belts as well as radiating and cooling equipment.

Accordingly, the selection of coating materials may be made which will provide good results within particular temperature operating ranges but which will be more or less effective outside the particular operating range due to its absorptivity character. Optimum coatings may therefore be selected in correlation with contemplated exposure times and temperatures to give best radiant heating results for particular materials. Where a coating is selected with a high absorptivity coefficient for a given range of radiating temperatures, but has a much lower coefficient at high temperatures, a built in safety feature is provided for treatment of materials which must not be over heated or which are combustible when heated in air beyond the ignition temperature.

In the manufacture of thin plastic films, as from polyethylene, cellophane, and many other well known materials, the plastic is usually cast from an extruder dye onto a highly polished cylinder or polished belt surface. If the film product is to be heated, as where solvent must be removed, application of radiant heat to the film carried on a belt coated on the outer side in accordance with this invention, has several advantages over the present process utilizing a polished cylinder. For example, the cost of equipment for any specified heat transfer rate is much less for the belt than for a heated cylinder, temperature may be controlled more easily throughout the length of the drying cycle and the cross ventilation techniques discussed above may be utilized to effect efficient removal of the volatiles, and sensible heat may be removed from the product by subjecting the plastic and conveyor belt to cooling apparatus such as radiators having a coolant liquid circulated therein. Where evaporation of a solvent is unnecessary, sensible heat may be removed by chilling the film.

Paper may also be heated or cooled more effectively on a belt having a high absorptivity coating. For example, a very high gloss paper is currently made by drying it in contact with a highly polished chrome plated cylinder, whereas, according to this invention the speed of such process can be greatly increased by using a highly polished stainless steel or chrome plated belt, for example, for contacting the product, the back side of said belt being treated to have a high emissivity coefficient.

Since a surface that has a high emissivity and absorptivity coefficient will also have an emissivity of the same value, chilling material on a conveyor belt, or on a cylindrical surface, may be carried out in accordance with this invention, more efficiently and quickly than heretofore possible when highly emissive coatings are applied to the conveyor. By circulating coolant through radiators 30, the treated belt surface will give off heat to the cooler at a much higher rate than it would if not coated with a highly emissive substance.

Referring now to FIGURES 8–10, the novel freeze drying process provided by the present invention consists, generally, in reducing the product to be dried to a frozen, finely divided powder; spreading the powder in a thin layer (preferably ranging up to an upper limit of about an inch thick, depending upon the product and the practical design considerations above set forth) on an endless conveyor belt disposed in a high vacuum chamber; and heating the frozen powder to sublime the water from it.

FIGURE 9 illustrates diagrammatically one process for reducing a liquid or semiliquid product to a frozen powder. The product flows from a product storage receptacle 68 through a conduit 70 into a product freezing vessel 72. A suitable refrigerant is circulated from refrigeration apparatus 74, which may be of any of the well-known types disclosed in pages 2121–2124 of Mark's Mechanical Engineers' Handbook (5th edition, 1951), or the type disclosed in my prior United States Patent No. 2,515,098, through a conduit 76 to product freezing vessel 72 where it is circulated through appropriate coils or other heat transfer elements to maintain the temperature of product freezing vessel 72 below the freezing temperature of the product. The refrigerant may be returned to refrigeration apparatus 74 through a conduit 78.

From product freezing vessel 72 the solidified product is delivered through a conduit 80 to comminuting apparatus 82 where it is reduced to a fine powder. Comminuting apparatus 82 may be of any commercial available construction such as the liquid gas cooled grinders manufactured by Linde Air Products Company and, by itself, forms no part of the present invention. The finely divided, frozen product is delivered from comminuting apparatus 82 through a conduit 84 to branch conduits 86 and 88 which terminate at the inlets of feed hoppers 90 and 92. Valves 94 and 96, disposed in branch conduits 86 and 88, permit the comminuted, frozen product to be selectively diverted into one or the other of the two feed hoppers.

From feed hoppers 90 and 92 (see FIGURE 8) the frozen product flows through conduits 98 and 100 into hoppers 102 and 104 located in a horizontally elongated vacuum vessel 106. Valves 108 and 110, disposed in conduits 98 and 100, control flow from hopper 90 to hopper 102 and from hopper 92 to hopper 104. A vacuum may be produced in hoppers 102 and 104 by a vacuum pump 112 which is connected to the hoppers by a main vacuum line 114 and branch vacuum lines 116 and 118. Valves 120 and 122, interposed in branch vacuum lines 116 and 118, permit hoppers 102 and 104 to be isolated from the ambient atmosphere after they have been evacuated.

Disclosed below the outlets of hoppers 102 and 104 is the inlet of a vibrating feeder 124 which may be of any desired construction such as that shown on page 1386 of Mark's Handbook, for example, and which, by itself, forms not part of the present invention. The outlet 126 of vibrating feeder 124 is arranged to deliver the frozen, comminuted product in a thin layer of uniform thickness onto the inlet end of a thin, endless, stainless steel or similar metal belt 128 trained over a pair of spaced, rotatably mounted rollers or pulleys 130 and 132, either one or both of which may be driven in the direction indicated by the solid arrows by an appropriate power source (not shown). Belt 128 may be coated with a radiant energy absorbing material in the manner described above in conjunction with the embodiment of FIGURE 1.

Hoppers 90, 102 and 92, 104 are intended to be alternately employed to maintain a continuous flow of product onto conveyor belt 128, the frozen, comminuted product being delivered first from comminuting apparatus 82 through conduit 84 to feed hopper 90, for example. Valve 108 is opened to fill hopper 102 with a charge of the frozen powdered product and closed to seal the upper end of hopper 102 which is then evacuated by opening valve 120 to connect hopper 102 to vacuum pump 112. After the hopper is evacuated, valve 120 is closed, isolating the hopper from the atmosphere. A valve 134, disposed in the outlet end of hopper 102 is then opened, allowing the product to flow into vibrating feeder 124 which spreads it on belt 128.

After hopper 90 is filled, valve 94 may be closed and valve 96 opened, causing the comminuted, frozen product to flow into feed hopper 92. The delivery process just described will then be repeated with the product eventually passing through a valve 135 disposed in the outlet end of hopper 104 into vibrating feeder 124.

As the frozen, comminuted product is carried through vacuum vessel 106, it is heated by radiators 136 and 138 disposed on opposite sides of the upper run of endless belt 128. Radiators 136 and 138 may be identical to the radiators 30 and 34 described above and, therefore, are not deemed to require further elaboration.

The interior of vacuum vessel 106 is maintained at a pressure below 0.180 inch of mercury absolute, a typical pressure being on the order of 0.0126 inch of mercury absolute. At this pressure the water in the product will, upon the application of heat, pass directly from the frozen state to the vapor state, i.e., sublimate, at —20° F. Radiators 136 and 138 are employed to heat the frozen, comminuted product to cause the moisture in it to sublime. The temperature of the product itself will not rise above the sublimation temperature (—20° F. at 0.0126 inch Hg abs.) until its moisture content has been eliminated. After the moisture content has been reduced to about 5% heat may be imparted to the product at a higher rate to bring it to room (or higher) temperature without heat damage depending on the product as discussed in detail in United States Patents Nos. 2,994,132 issued August 1, 1961, to Neumann for "Freeze Drying Apparatus" and 2,471,667 which was referred to above. If the product being freeze dried is heat sensitive, the rate at which heat is applied to the product is maintained low enough to prevent product damaging temperatures from developing. If the product is less sensitive to heat, the rate of heat supply may be raised to a higher value, increasing the rate of sublimation and thereby shortening the drying time.

Examples of heat sensitive products are orange juice, which will lose its flavor and become a sticky plastic mass if overheated; coffee and tea products, which will lose volatiles providing flavor and aroma if overheated; and certain biological preparations and cultures which will be biologically altered by overheating.

The rate of heat supply to the product is preferably decreased as the distance from the feed end of the conveyor increases. This insures that, as the moisture is removed from the product, the heat input to the product will be decreased to prevent overheating. The necessary reduction in the rate of heat supply may be effected, for example, by progressively decreasing the radiator temperatures, decreasing the size or increasing the spacing of the radiators, or by increasing the distance between the radiators and the conveyor.

As set forth in the table above, the length of the conveyor may be decreased and the conveyor speed increased by decreasing the thickness of the product layer. The minimum practical thickness of product layer will be determined by the rate at which radiant energy can be supplied to the product to sublimate the moisture from it. Thus, conveyor lengths could be decreased and conveyor speeds increased to the point that enough energy could not be supplied to the product while on the conveyor to sublimate the moisture from it even though the product were spread in a very thin layer. The minimum thickness will in practice depend on the moisture content of the product, radiator temperature, and a number of other factors as well as belt lengths and speed.

From conveyor belt 128, the dried or dehydrated product flows into one of two discharge hoppers 140 or 142. A doctor blade (not shown) such as the doctor blade 38 described above or the doctor blade described in detail in my prior United States Patent No. 2,515,098 may be employed to scrape the dried material from belt 128. The flow of the dried product may be diverted into a selected one of the two hoppers 140 and 142 by a selectively adjustable feeder vane 144 pivotally mounted on a pin 146 between the two hoppers.

From hoppers 140 and 142 the dried product passes through conduits 148 and 150 into hoppers 152 and 154. Valves 156 and 158, disposed in conduits 148 and 150, control the flow of the dried product between hoppers 140 and 152 and between hoppers 142 and 154 and seal the lower ends of hoppers 140 and 142 from the ambient atmosphere. From hoppers 152 and 154 the dried product flows into containers 160 and 162.

The two discharge hopper arrangements, 140, 152 and 142, 154 are intended to be employed alternately. Thus, while the dried product is flowing from conveyor belt 128 into hopper 142, hopper 152 will be evacuated by opening a valve 164 interposed in a vacuum line 166 connecting hopper 152 to vacuum pump 112 (hopper 154 may similarly be evacuated through a line 168 connected between the hopper and line 166 and controlled by a valve 170). Valve 164 is then closed, sealing hopper 152 from the ambient atmosphere, and valve 156 is opened, allowing dried product in hopper 140 to flow into hopper 152. Valve 156 is then closed to establish a seal between hoppers 140 and 152 and a valve 172 at the outlet end of hopper 152 is opened to establish communication between hopper 152 and container 160.

Hopper 152 is connected by a conduit 176 to a bottle 178 (or other source) of nitrogen or other dry, inert gas which will not oxidize or introduce water vapor into the dried product. After hopper outlet valve 172 is opened, a valve 180 in nitrogen supply line 176 is opened allowing the nitrogen to flow into hopper 152 and break the vacuum therein so that the hopper contents will flow freely into container 160. A similar vacuum breaking arrangement identified by identical reference characters is provided for hopper 154.

After hopper 152 is emptied, valve 172 is closed and valve 170 is opened to evacuate hopper 154. Adjustable feeder vane 144 may then be moved to the position shown in dotted lines and the dried product discharged from conveyor belt 128 into hopper 140. Then, in the manner described above in conjunction with hopper arrangement 140, 152, the product in hopper 142 may be discharged through valve 158, hopper 154, and hopper outlet valve 182 into container 162.

It is necessary for satisfactory operation to continuously remove the evaporated water from vacuum vessel 106 since, at 0.0126 in. Hg abs. pressure and −20° F., for example, each pound of water removed from the product occupies several thousand cubic feet. This may be done by spraying a refrigerated solution of absorbent material such as lithium chloride into vacuum vessel 106, a process described in detail in my prior United States Patent No. 2,515,098; or by removing the vapor from the vacuum vessel, freezing it batchwise on refrigerated surfaces, and melting the ice by reverse cycle refrigeration. A third, preferred method of removing the water vapor is shown in FIGURE 8. The vapor removing apparatus employed in the preferred process includes a condensor 183, connected to vacuum vessel 106 by a conduit 184 and to a vacuum pump 186 by a conduit 188. Vacuum pump 186, which is also used to pump down vacuum vessel 106 when the system is started up, draws the accumulated water vapor from vacuum vessel 106 through conduit 184 and upwardly through condensor 183 where it is absorbed by a refrigerated solution of an absorbent material such as lithium chloride, or a glycol or other absorbent liquid, which is pumped through a conduit 190 into the upper end of condensor 183 (which is preferably of the barometric or jet type described in Potter, Steam Power Plants, pp. 276–280) and flows downwardly through condensor 183 over interleaved horizontal baffles 194. From the lower end of condensor 183 the lithium chloride solution, heated and diluted by absorbed water vapor, flows through a conduit 196 into circulating pump 198 which pumps it through conduit 200 into a chiller 202 which may be any appropriate type of refrigeration apparatus such as the ammonia compression type system disclosed in my prior United States Patent No. 2,515,098. Chiller 202 refrigerates the concentrated lithium chloride solution for recirculation to condensor 183.

A second, smaller circulating pump 204 continuously draws a portion of the diluted solution from conduit 200 into a counterflow type heat exchanger 206 where it is concentrated by boiling off the absorbed water. The necessary heat may be supplied by a boiler 208 connected to heat exchanger 206 by conduits 210 and 212. Both boiler 208 an dheat exchanger 206 may be of any conventional construction (typical counterflow heat exchangers are illustrated in Babcock and Wilcox Steam, pp. 11–16 to 11–18) and, by themselves, form no part of the present invention.

From heat exchanger 206 the re-concentrated lithium chloride solution is forced by pump 204 through conduit 214 into conduit 200. A valve 219 on the intake side of pump 204 permits varied proportions of the circulating lithium chloride solution to be drawn into heat exchanger 206 so that the amount of vapor removed in heat exchanger 206 will equal the amount absorbed in condenor 183. In this manner the condensible water vapor is removed from the system. Non-condensible vapors which leak into the system are removed from condensor 183 through off-take conduit 188 by vacuum pump 186.

FIGURE 10 illustrates an alternate process for reducing the product to be dried to a fine, frozen powder. The product is pumped from a product storage receptacle 220 through a condiut 222 to a product freezing vessel 224. Conduit 222 terminates in an atomizing nozzle 226 through which the liquid or semiliquid product is forced at pressures ranging up to 1000 p.s.i. Atomizing nozzle 226 breaks the product into a fine mist or fog which is entrained in an upwardly flowing stream of cool, inert gas such as nitrogen, hydrogen or carbon dioxide forced under pressure from a gas supply source 228 through a conduit 230 into a manifold 232 surrounding the lower end of product freezing vessel 224. Appropriately spaced nozzles 234 direct the gas from manifold 232 upwardly through product freezing vessel 224. As the product is contacted by the cold, inert gas, it is frozen into fine particles, some of which drop to the bottom of vessel 224 and the remainder of which are swept upwardly by the gas and removed from product freezing vessel 224 through an off-take conduit 236. From conduit 236 the mixture of particles and gas is delivered to a cyclone separator 238 which may be of the type described in my copending application No. 228,429, filed Oct. 4, 1962 (now Patent No. 3,189,460), and which separates the gas from the frozen particles. The gas is removed from the separator through a conduit 240 to appropriate collecting, refrigerating, and recirculating equipment which may be similar to the chiller 202 and indicated generally by reference character 242 in which the gas is refrigerated and recirculated through conduit 244 to product freezing vessel 224. The frozen ice-product particles flow from the lower end of cyclone separator 238 through conduit 246 and branch conduits 248 and 250 to feed hoppers 90 and 92, respectively.

The particles which fall to the bottom of vessel 224 flow through a conduit 255 to conduit 246 where they joins the particles collected in separator 238. Valves 252 and 254, interposed in conduits 248 and 250, control flow of product into hoppers 90 and 92.

As was pointed out above, the rate at which radiant energy is applied to the product on endless conveyor belt 128 is preferably decreased adjacent the discharge end of the conveyor to prevent overheating of the product after it has reached a substantially dry condition. Indeed, some products are so heat sensitive that, after the moisture has been sublimed, it is necessary not only to terminate the application of radiant heat, but to actually chill the dry product to prevent it from overheating. It may be necessary, for example, to chill products such as fruit juices after they are dried and before they are discharged from the conveyor to prevent them from turning into a soft sticky mass. A preferred arrangement for chilling the dried product, should this be deemed desirable, is illustrated in FIGURE 11. The apparatus shown in this figure is, with certain modifications which will be pointed out presently, identical to the apparatus illustrated in FIGURE 8 and identical reference characters have, therefore, been employed to designate elements which are identical in the two embodiments.

Two chilling elements or components, either one or both of which may be employed depending upon the product, are preferably provided. The first is a chilling roll 256 at the discharge end of endless belt 128 which replaces the discharge roller 132 in the embodiment of FIGURE 8 and over which endless belt 128 travels. The second consists of chilling panels 258 and 260 disposed on opposite sides of the upper run of the endless belt 128 adjacent its discharge end. To make room for chilling panels 258 and 260, radiators 262 and 264 (which, except for their dimensions, are identical to the radiators 136 and 138 described above) are terminated short of chilling roll 256.

Chilled liquid may be circulated through chilling roll 256 and chilling panels 258 and 260 from any suitable refrigeration apparatus such as, for example, chiller 202 (shown in FIGURE 8 but not in FIGURE 11). Suitable manually operated valves (not shown) may be provided to control the flow rate through the chilling roll and panels and, consequently, the rate at which heat is removed from the dried product.

To insure that substantially all of the product is removed from chilling roll 255, a doctor blade 266 is mounted in spaced relation to chilling roll 256 closely adjacent endless conveyor 128 to scrape sticking product from the conveyor. Doctor blade 266 may be identical to the doctor blade 38 described above or to the doctor blade described in detail in my prior United States Patent No. 2,515,098.

This invention may be embodied in other specific forms without departing from the spirit or essential characteristics thereof. The present embodiments are therefore to be considered in all respects as illustrative and not restricted, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. Apparatus for freeze drying liquid and semiliquid products comprising, in combination:
    (a) a vacuum chamber;
    (b) means for maintaining said vacuum chamber at a pressure not exceeding about 0.180 inch of mercury absolute;
    (c) means outside said vacuum chamber for reducing the product to a fine frozen powder including a vessel, means for spraying the product into the vessel, a source of inert gas, means for refrigerating said gas, means for effecting an upward flow of the refrigerated gas through said vessel to thereby contact and freeze said product, and a cyclone type separator for separating the frozen product from the gas;
    (d) a continuously operating conveyor disposed in the vacuum chamber;
    (e) means for delivering said powder to one end of said conveyor and spreading it thereon in a thin layer of substantially uniform thickness;
    (f) means for applying heat to the frozen product on said conveyor to sublime the water therefrom; and
    (g) means for removing said product and the water vapor sublimed from said product from the chamber.

2. Apparatus for freeze drying liquid and semiliquid products comprising, in combination:
    (a) means for reducing the product to a fine frozen powder;
    (b) a continuously operating belt type conveyor disposed in a chamber maintained at a pressure not exceeding about 0.180 inch of mercury absolute;
    (c) means for delivering said powder to one end of said conveyor and spreading it on a leg thereof in a thin layer of substantially uniform thickness;
    (d) means for applying heat to the frozen product on said conveyor to sublime the water therefrom including radiators disposed on opposite sides of and in parallel spaced relation to the leg of said conveyor on which the product being dried is spread, said conveyor being of heat conductive material having on the side thereof opposite that on which said product is spread a coating of a material having an absorption coefficient of at least 0.95, the side of said conveyor on which said product is spread being free of said coating and being polished to provide a surface having a low coefficient of absorption to thereby equalize the transfer of heat from the radiators on the opposite sides of said conveyor to the product spread thereon; and
    (e) means for removing said product and the water vapor sublimed from said product from the chamber.

3. Apparatus as claimed in claim 2, wherein the means for delivering the product to and spreading it on the belt type conveyor includes a vibrating conveyor.

4. Apparatus as defined in claim 2, including means for heating said product to at least ambient temperature after the moisture has been sublimed therefrom.

5. Apparatus for freeze drying liquid and semiliquid products comprising, in combination:
    (a) means for reducing the product to a fine frozen powder;
    (b) a continuously operating, belt type conveyor disposed in a chamber maintained at a pressure not exceeding about 0.180 inch of mercury absolute;
    (c) means for delivering said powder to one end of said conveyor and spreading it on one leg thereof in a thin layer of substantially uniform thickness;
    (d) means for applying heat to the frozen product on said conveyor to sublime the water therefrom;
    (e) means for cooling the dried product including panels at one end of said conveyor in parallel spaced relation to and on both sides of the conveyor leg on which the product being dried is spread, a roller adjacent said panels with the conveyor belt trained therearound, and means for circulating a cold heat transfer fluid through said panels and said roller; and
    (f) means for removing said product and the water vapor sublimed from said product from the chamber.

6. The apparatus as claimed in claim 2, wherein the means for reducing the product to a fine frozen powder includes means for freezing the product and means for comminuting the frozen product.

7. The apparatus as claimed in claim 2, together with:
 (a) a condensor;
 (b) means for effecting a flow of said water vapor from the vacuum chamber through said condenser to condense said water vapor;
 (c) a source of absorbent liquid; and
 (d) means for circulating said absorbent liquid through said condensor to absorb said water vapor.

8. Apparatus as defined in claim 7, together with means for heating the absorbent liquid leaving said condensor to boil off the water vapor absorbed by said liquid.

9. Apparatus as defined in claim 7, together with an off-take conduit connected to said condensor, and means for removing non-condensible vapors from the freeze drying apparatus through said off-take conduit.

References Cited by the Examiner

UNITED STATES PATENTS

| | | | |
|---|---|---|---|
| 2,198,617 | 4/1940 | Hoelscher et al. | 34—5 |
| 2,467,318 | 4/1949 | Kellogg | 34—5 X |
| 2,515,098 | 7/1950 | Smith | 34—5 X |
| 2,523,552 | 9/1950 | Birdseye | 34—5 X |
| 2,533,125 | 12/1950 | Levinson et al. | 34—5 X |
| 2,592,902 | 4/1952 | Hurst | 34—236 |
| 2,616,604 | 11/1952 | Folsom | 34—5 X |
| 2,620,573 | 12/1952 | McMahon | 34—5 |
| 2,668,364 | 2/1954 | Colton | 34—5 X |
| 2,728,387 | 12/1955 | Smith. | |
| 2,751,687 | 6/1956 | Colton | 34—92 X |
| 2,876,558 | 3/1959 | Lowe et al. | 34—236 |
| 3,024,117 | 3/1962 | Barlow | 62—74 X |
| 3,067,586 | 12/1962 | Offen | 34—62 X |

ROBERT A. O'LEARY, *Primary Examiner.*

NORMAN YUDKOFF, *Examiner.*

MEYER PERLIN, F. E. DRUMMOND, W. E. WAYNER, *Assistant Examiners.*